United States Patent [19]
Sitbon et al.

[11] Patent Number: 5,797,006
[45] Date of Patent: Aug. 18, 1998

[54] APPLICATION INTEGRATION ARCHITECTURE FOR A DATA PROCESSING PLATFORM

[75] Inventors: Gerard Sitbon, Vitry; Christian Baillif, Bourg La Reine; Marc Blochet, Les Clayes/Bois; Jean-François Bassier, Sucy en Brie, all of France

[73] Assignee: Bull S.A., Louveciennes, France

[21] Appl. No.: 683,413

[22] Filed: Jul. 19, 1996

[30] Foreign Application Priority Data

Jul. 21, 1995 [FR] France ................... 95 08851

[51] Int. Cl.$^6$ ........................................ G06F 11/00
[52] U.S. Cl. .................. 395/682; 395/184.01; 395/602
[58] Field of Search ..................... 395/682, 184.01, 395/343, 602

[56] References Cited

U.S. PATENT DOCUMENTS

| | | | |
|---|---|---|---|
| 5,412,776 | 5/1995 | Bloomfield | 395/160 |
| 5,432,934 | 7/1995 | Levin et al. | 395/650 |
| 5,524,238 | 6/1996 | Miller et al. | 395/600 |
| 5,638,509 | 6/1997 | Dunphy et al. | 395/182.18 |

FOREIGN PATENT DOCUMENTS 9406074  3/1994  WIPO.

OTHER PUBLICATIONS

Research Disclosure No. 316 Aug. 1990, Havant, GB, p. 666, XP 000140995, Divulgation No. 31689: "Intelligent Workstation Interface to Host Applications", Entire Document.

NEC Research and Development, vol. 32, No. 1, Jan. 1991, Tokyo, JP, pp. 130–141, XP 000229428, O. Mikami & K. Sugyo "Heterogenous Computing Environment 'Couple'".

1994 IEEE Network Operations and p. 684, line 1 – Management Symposium, vol. 2, 14–17 Feb. 1994, Kissimee, FL, USA, pp. 681–690, A.C. Salvador & G.A. Sundstrom, "A Task–Based Graphical User Interface for Network Management", p. 690, last line.

IBM Technical Disclosure Bulletin vol. 30, No. 2, Jul. 1987, NY US, pp. 736–738, XP 000022394, "Incidence Matrix Sequencing", Entire Document.

IBM Technical Disclosure Bulletin vol. 37, No. 4A, Apr. 1994, NY US, pp. 337–339, "Real–Time Mechanism for Accounting and Network Access Control" Entire Document.

*Primary Examiner*—Lucien U. Toplu
*Attorney, Agent, or Firm*—Edward J. Kondracki; Kerkam, Stowell, Kondracki & Clarke, PC

[57] ABSTRACT

An application integration architecture (MO) for a data processing platform (PL) constituted by a network (RE) of machines running a plurality of heterogeneous applications (APA), the codes of which are not modifiable and each of which includes a plurality of external interfaces (IE), characterized in that, for the purpose of modifying the basic characteristics of these applications in a way that is transparent to the user, it comprises:

a) an ergonomic integration module (MIG) for the centralized control of the applications with a graphical interface (GI), b) an operational continuity module (MCF) which executes actions to prevent them from operating abnormally, c) a module (MSC) for intercepting the dialogues between the components in order to ensure their logical security and the accounting of the resources consumed by the user.

8 Claims, 7 Drawing Sheets

5,797,006

APPLICATION INTEGRATION ARCHITECTURE FOR A DATA PROCESSING PLATFORM

FIELD OF THE INVENTION

The present invention relates to an application integration architecture for a data processing platform constituted by a network of machines running a plurality of heterogenous applications whose codes are not modifiable.

BACKGROUND OF THE INVENTION

Modern information systems are built on distributed architectures. This means that the services required by an application are located in several systems which communicate with one another: transaction processing systems, data base management systems, printer systems, electronic directories, security systems, etc. This distribution enables considerable flexibility in its utilization and important gains in performance.

The current trend in the development of business information systems (also known as "business servers") is to constitute data processing platforms formed by a plurality of different elements (for example different models from different manufacturers) such as hardware components (processors, memories, peripherals, network), an operating system, a network system, a management system, and middleware, formed by, for example, a data base manager, a distributed transaction monitor and client applications.

Platforms of this type are particularly well adapted to the markets known as "large accounts" which accommodate large users such as large companies, large banks and large administrations, and which require the following characteristics:

a large number of transactions per second, high availability of the system, independence from suppliers, interoperability between the various systems which constitute the platform.

These platforms are, in fact, known as "production oriented systems." In this respect, they have the same function as the traditional mainframes of large computer manufacturers. This means that they must exercise a high level of control over the customer service requests made by the customer-user. A customer service request of this type is a work unit which (can be a sales order, a request for assurance, or even a request for) used as an input to a business process. The production services supplied by platforms of this type include not only transactions but also task accomplishment, message queuing, job streams, batch sequencing, and printing means, all of which dispositions make it possible to satisfy the service request made by the customer-user.

FIG. 1 outlines the general structure of a business platform which meets the criteria stated above and the global technical context to which it belongs.

A platform PL of this type comprises a plurality of information systems, more commonly called machines, with the standard essential components, processors, central processing unit, input/output devices, peripherals, etc. Often, one of the machines plays a specific role in relation to the others and is called a control platform or a control server SERV, the other machines being target machines or target platforms, namely PLC1, PLC2, ... PLCi, ... PLCn.

The server SERV is linked by a network RE to PLC1 through PLCn, only four of which are represented here in FIG. 6, for purposes of simplification. These four platforms are PLC1 through PLC4. Each one of them is assumed to use a different operating system SE1 through SE4.

Depending on the type of the target platform, a determined communications protocol is used in the network RE, it being understood that the different communication links corresponding to each of the platforms share a common physical support, namely that which is specific to the network RE. In the server SERV as well as the in target machines PLC1 through PLC4, these protocols are implemented by communications means MCOM.

In current practice, the business platform PL is also linked by an exterior network REE to other business platforms PL1, PL2, ... PLi, ... PLn. Communications protocols other than the internal protocols of each business platform are used in REE, one of the most frequently employed being the Internet Protocol, abbreviated IP.

OBJECT OF THE INVENTION

The object of configuring a platform of this type is to integrate all of the various elements which constitute it so as to provide the customer-user with an operational environment while improving the performance of each element to achieve a determined objective in the attributes of the business servers, for example, logical security, data security, accounting of the resources used, high availability, fault tolerance and centralized administration.

Within this framework, one of the essential problems to be solved is to modify the characteristics of the client applications and the middleware, by improving them as indicated above, when the designer of the business server does not control their source codes.

There is no package currently on the market which meets the criteria mentioned above.

SUBJECT OF THE INVENTION

The present invention consists of the definition and embodiment of an architecture which makes it possible to integrate each application using a set of means which act on its external interfaces and which monitor the elements required to run it.

According to the invention, the application and middleware integration architecture for a data processing platform constituted by a network of machines running a plurality of heterogeneous applications, the codes of which are not modifiable and each of which includes at least all or part of the following external interfaces:

its configuration file, a log file which records the events related to it, a mechanism for communicating between processes running on this machine (or these machines), a set of commands which make it possible to modify its characteristics, a set of system resources which allow it to run, a set of peripherals used for its data input/output needs, is characterized in that, for the purpose of modifying the basic characteristics of these applications in a way that is transparent to the user, relative to their security, availability, ergonomics, administrability, interoperability, monitoring, accounting of the resources consumed by the user, it comprises:

a) an ergonomic integration module for centralized control of the applications with a graphical interface, b) an operational continuity module which, by periodically scanning the log files and by monitoring the components of the application, executes actions to prevent them from operating abnormally;

c) a module for intercepting the dialogues between these components in order to ensure the logical security of the applications and the accounting of the resources consumed by the user.

BRIEF DESCRIPTION OF THE DRAWING

Other characteristics and advantages of the present invention will appear in the following description, given as a non-limiting example in reference to the appended drawings. In these drawings.

DESCRIPTION OF AN EXAMPLE OF A PREFERRED EMBODIMENT OF THE INVENTION

1) OVERVIEW

Figure 1:
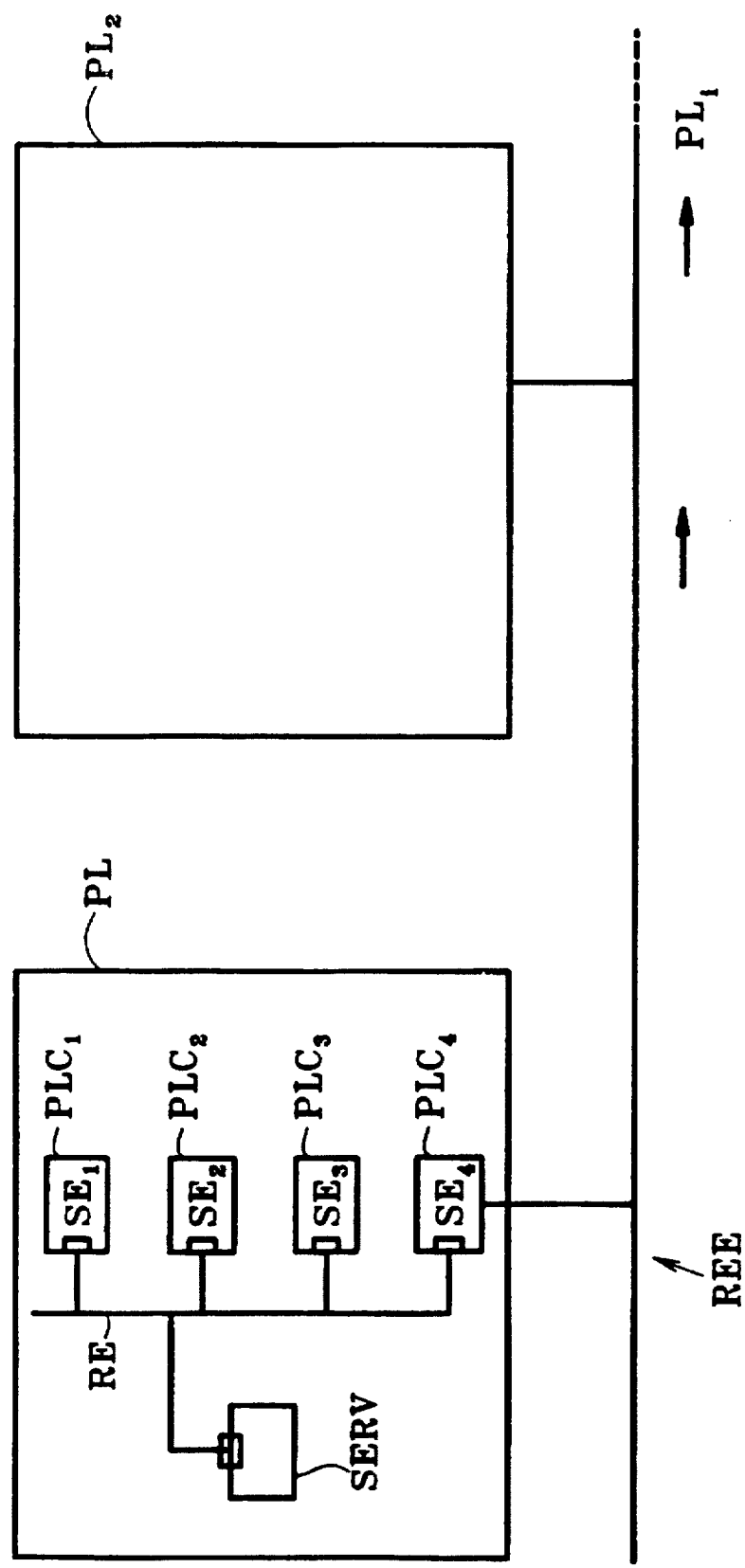
FIG. 1 outlines how the current business information systems within the field of the invention are configured, FIG. 2 outlines the general structure of an application.

In an application AP is represented by the central square in the sides of which are indicated by bold solid lines. This application is assumed to run on the business platform PL, which is not shown in this figure for purposes of simplification. The latter is, for example, the type defined above in the introduction related to FIG. 1, that is a platform for large accounts, known as a "production" oriented platform.

It is formed by a plurality of machines of various types disposed in a network RE, on which run heterogeneous applications, among them AP.

In the scope of the invention, it is acknowledged that the source codes of the application AP are not modifiable under any circumstances.

Figure 2:
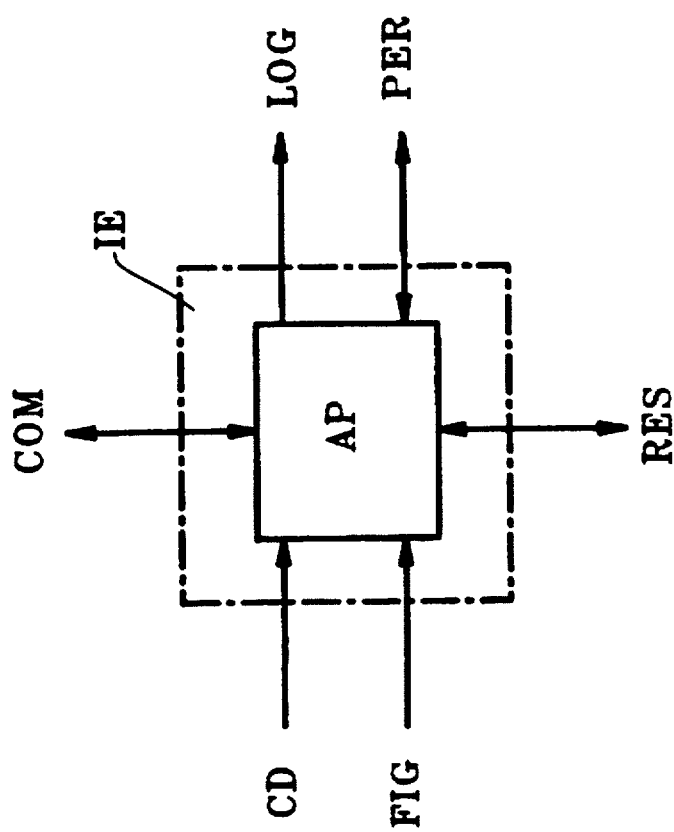

AP includes a set of external interfaces IE which allow it to communicate with all or some of the elements which constitute PL. It is symbolized in FIG. 2 by the space located between the square indicated in bold dot-and-dash lines on the one hand, and the square indicated in bold solid lines on the other hand, which square indicated by bold solid lines symbolizes the application AP. For this purpose, the set IE comprises, for example:

a configuration file FIG for AP, a set of commands CD or an API (English acronym for Application Programmatic Interface) which allows its characteristics to be modified, a communications mechanism COM which allows it to communicate with all of the local processes running on PL, as well as with other processes running on other remote platforms PL2, . . . PLi, by means of the external network REE, a log file LOG in which the set of events related to it are recorded over time, a set of system resources RES which allows it to run, composed of processes, libraries, message files, data processors, memories, adapters, etc., a set of peripherals PER used for its data input/output needs (printers, disks, etc.).

2) OBJECTS SOUGHT BY THE INVENTION

Figure 3:
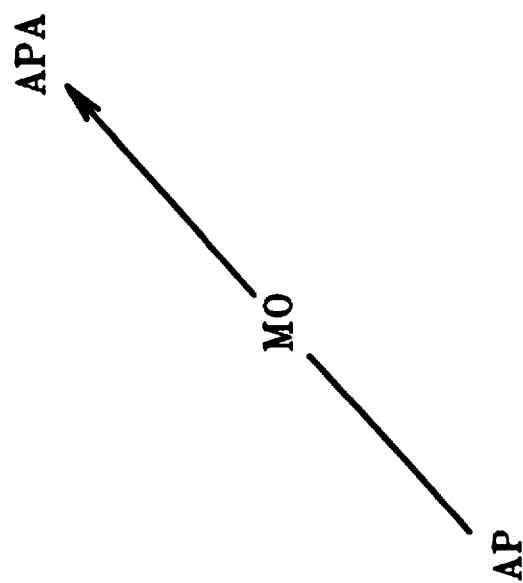
FIG. 3 illustrates the basic concept of the invention.

The object sought by the invention, symbolized by the arrow in FIG. 3, is to appreciably increase the performance levels of all the applications including AP which run on PL, by means of an application integration architecture, more frequently called an operation monitor MO. This is particularly carried out in the areas of security, availability, ergonomics, administratability, interoperability, monitoring, or accounting of the resources consumed by the user, for the purpose of optimizing their utilization.

Thus, thanks to the operation monitor MO, the application AP becomes the "improved" application APA, as shown in FIG. 3. It will be recalled that the user does not have access to the source code of AP and that he or she does not have any way of knowing it. The improvement in performance is transparent for the user.

More precisely, relative to performance in the areas mentioned above, the monitor MO must have the following characteristics:

maintaining the continuity of the service requested, even in the event of failures, and certainly with the application remaining unchanged, in terms of security, characteristics must be added to the application in order to prevent any access to APA by unauthorized users, without any change in APA, a graphical display system, (more commonly called GUI, the English acronym for Graphical User Interface) which is common to the applications: all the commands and instructions (tutorials) must be programmed and processed immediately using all the objects of the graphical interface, which interface is specifically the X/Motif (registered trademark) type, event management: the event files of the applications, known as log files, must be continuously analyzed by a permanent programmed monitoring process, and when a determined event occurs, a specific action must be taken, automatic operation: all the requests of the applications result in a set of actions which must be executed automatically without any human intervention. For this purpose, characteristics known as "automated system operations," abbreviated A.S.O., must be specially programmed for cases in which abnormal situations arise, accounting/performance: information supplied by the application which measures the extent of the utilization of the various system elements used to run it is collected by suitable tools specific to the architecture according to the invention, which information is intended to be used by tools for distributing the work load to be performed by these elements in accordance with the extent of their utilization at a given moment. Tools of this type are described, for example, in French patent application No. 94 14368, filed Nov. 30, 1994 by the Applicant under the title "Tool to aid in distributing the load of a distributed Assignee of application." A corresponding application was filed in the U.S. on Dec. 30, 1994, and assigned Ser. No. 08/366,909. The subject matter of U.S. application Ser. No. 08/366,909 is incorporated herein by reference.

Thus, by simplifying the tasks and through automation, the operating cost of PL is reduced and its performance level is increased. The uniform presentation of specific business data despite the heterogeneity of the elements which constitute PL, combined with the graphic display of the results, leads to an improved efficiency of the systems administration managers, a much higher quality of service, and distinctly shorter response times.

3) STRUCTURE OF THE OPERATION MONITOR MO

Figure 4:
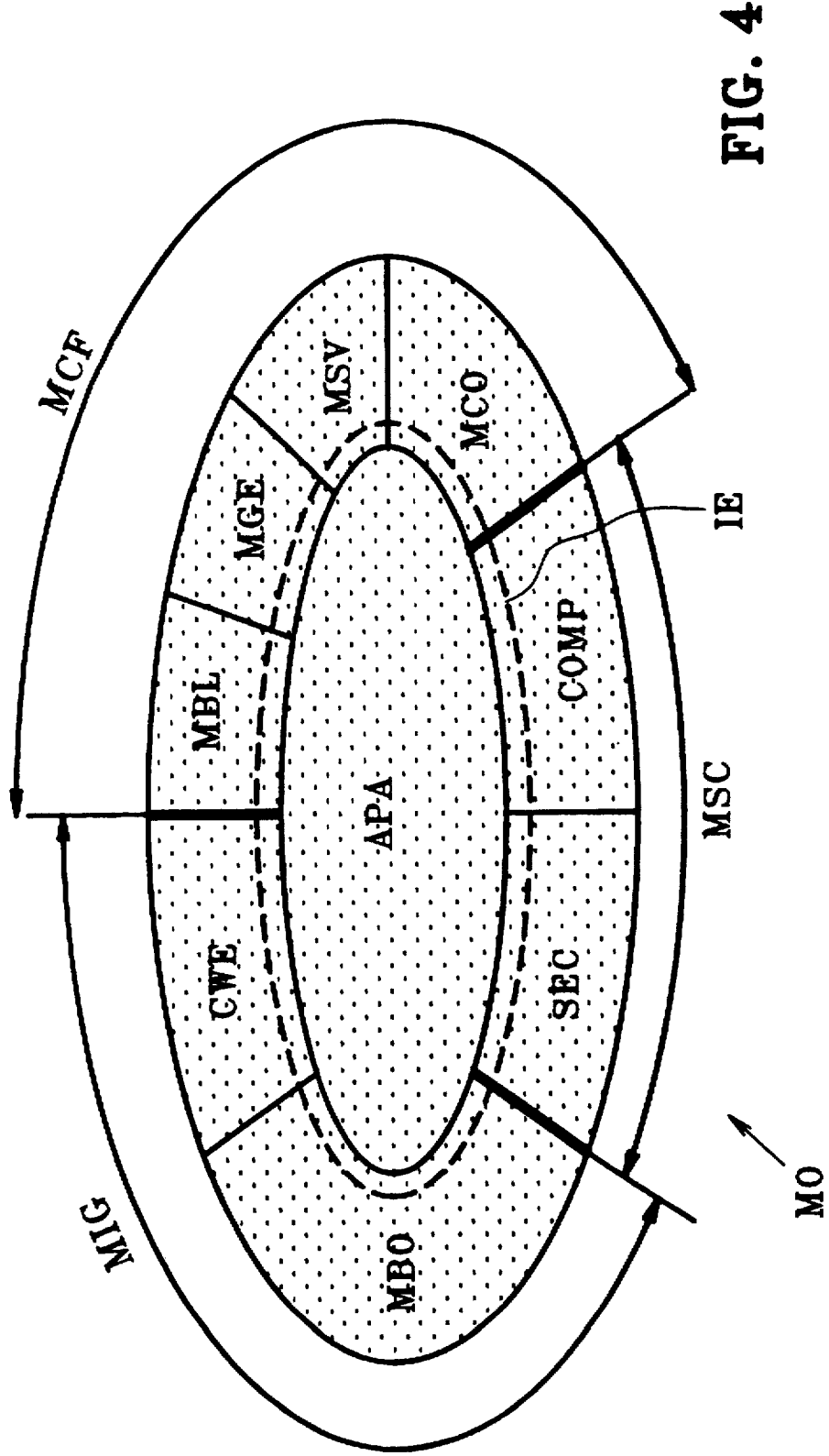
FIG. 4 shows the essential characteristic elements of the invention, as well as their preferred embodiments.

With reference to FIG. 4, this figure illustrates, in elliptical form, not only the application APA with its improved performance, but the set of external interfaces IE which surrounds it (represented by a broken line), and the operation monitor MO according to the invention. APA and MO appear symbolically at the center and on the periphery of FIG. 4, respectively.

MO, which acts on IE as stated above, comprises the following essential characteristic elements:

A) The ergonomic integration module MIG with a graphical interface, which carries out the centralized control of all the applications such as APA, B) The module MCF which ensures the operational continuity of PL when APA is running, by periodically scanning the file LOG and by monitoring the components of APA and which, based on the results supplied by this scanning and this monitoring, executes actions to eliminate any possible abnormal operation of this application APA, C) The security and accounting module MSC, which intercepts the dialogues between the various components of APA in order to ensure the logical security of APA on the one hand, and the accounting of the resources consumed by the user of this application on the other hand.

4) DETAILED STRUCTURE OF THE MODULES OF MO

A) The module MIG comprises:

The module MBO, which is a control panel (or dashboard, in English) with a graphical interface, preferably the X/Motif type, which makes it possible to control all of the applications such as APA from a centralized location, The command integration module CWE, which uses the same graphical interface as MBO.

1. MBO is supported by a set of modules and icons which correspond to the various applications which can run on PL.

Two possibilities are offered to the user:

a conventional way through which he or she navigates in a standard cascading window mode, a single-window mode in which the applications are represented in a single tree which allows direct access to an application by clicking once on the mouse associated with the console which supports the graphical interface, called GI.

It is possible for the user to switch from the conventional mode to the single-window mode at any time.

Figure 5:
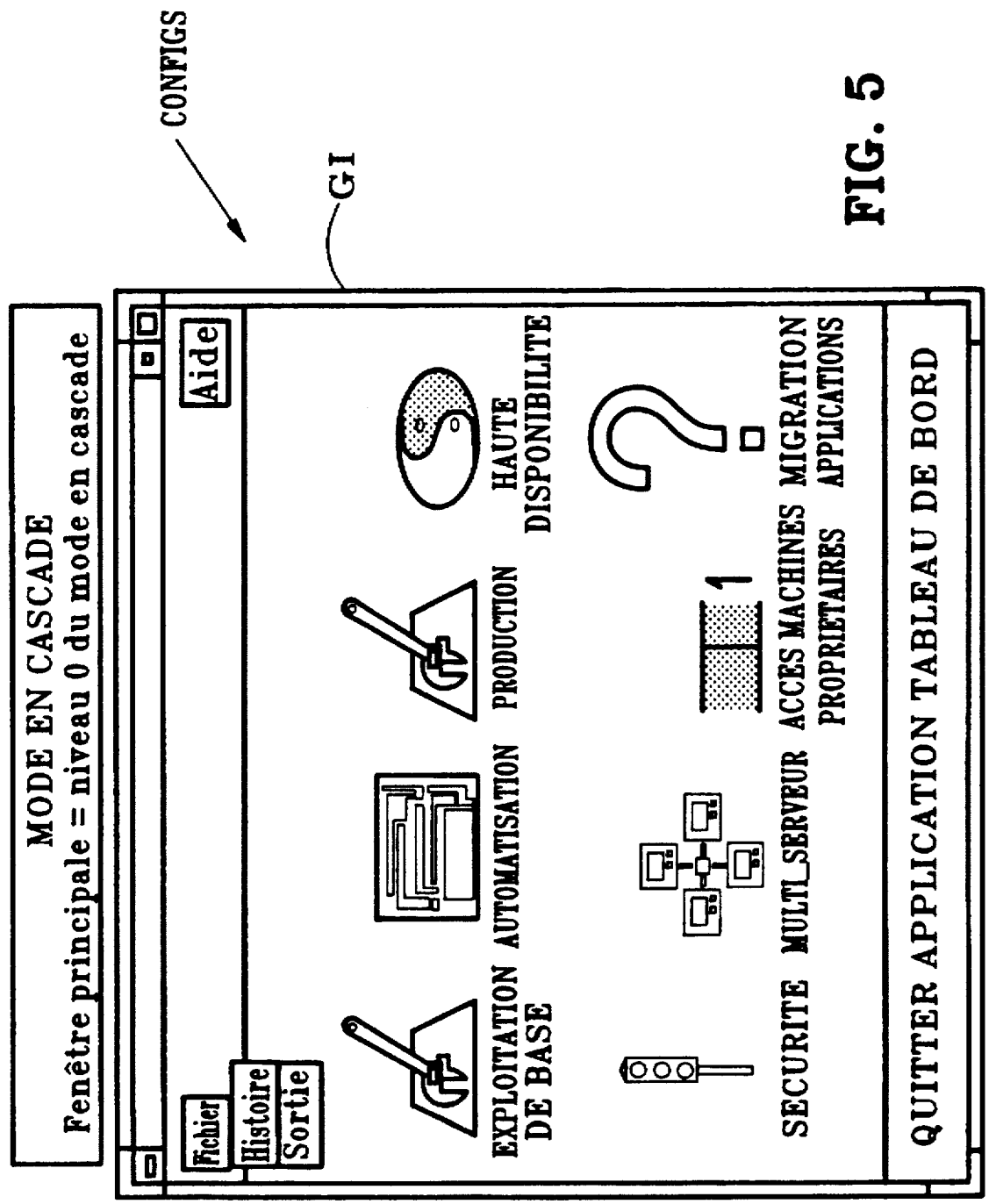
FIG. 5 shows the main window of the control panel (or dashboard, in English) module with a graphical interface, an essential characteristic element of the invention, as it would appear on the screen.

FIG. 5 shows the main window of MBO displayed on the screen of the graphical interface GI, in the conventional way.

This window represents the first level, called level 0, of the succession of cascading windows which can be opened from it.

The object of MBO is to manage and administer all the applications such as APA which are called to run on PL by rapidly providing a complete, hierarchical view of their organization by class of utilization (for example the class of all the applications whose essential function is to manage the security of access to all or some of the elements of the platform).

The description of this organization is separate from the graphical interface GI itself. It is done in a file CONFIGS for describing the cascading structure of the various windows, a file which is located in the machine on which GI runs, which here is actually the control platform SERV.

Thus, any modification of this description is reflected in the changing of the application which follows it, without there having been a modification of any line of the application associated with the graphical interface.

This particular characteristic allows the designers of the platform PL to decide, as late as possible and at any moment, to modify the organization of these applications.

Returning to FIG. 5, the various icons represented have the following significance.

The description of the icons in reference to this figure is given line by line, from left to right.

The first icon relates to the basic operations (the kernel, in English) of PL, meaning the distribution of tasks (job scheduling, in English), backup file management, print management, the description of the network, event management, etc.

The second relates to the automatic operation (or automation, in English), for example automatic job scheduling based on load, a command script (or simply, script, in English) executed in case of failure.

The third relates to production: data base management applications, transaction processing applications, etc.

The fourth relates to high availability.

The fifth (second line) relates to the security of access to the various components of PL.

The sixth relates to the management of the entire network RE and the various platforms PLCi.

The seventh relates to access to large "proprietary" (that is, manufacturer-specific) central processor-type platforms PLCi.

The eight relates to the migration of the data and applications (sometimes referred to as rehosting).

Figure 6:
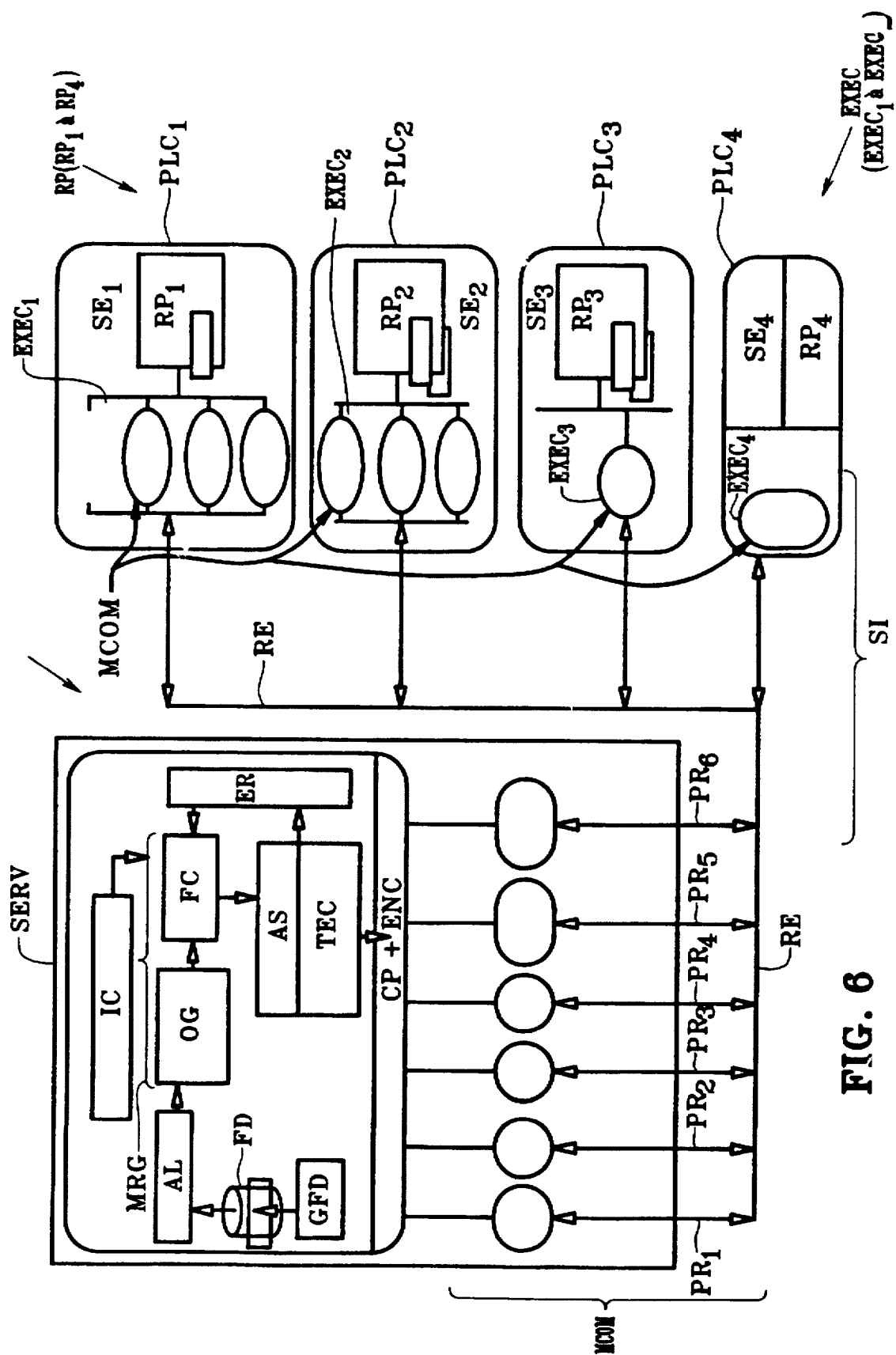
FIG. 6 illustrates how the command integration module with a graphical interface belonging to the ergonomic integration module with a graphical interface is constituted, FIG. 7, formed by FIGS. 7a, 7b, shows two examples of embodiment of the essential characteristic element which ensures the operational security of the architecture according to the invention.

2. FIG. 6 which illustrates the principal elements which constitute the module CWE and its main lines of operation, it being understood that their respective detailed structures and modalities are contained in the above-mentioned French patent application No. 94 14368, and its corresponding U.S. application Ser. No. 08/366,909. It is understood that FIG. 6 is within the scope of the business platform PL in FIG. 1, formed by SERV and the target platforms PLC1 through PLC4.

The principal characteristics of CWE are:

a specific language for generating commands (described in detail in the above-mentioned patent application), with a common graphical display system for all of these commands, an execution of the commands which adapts to the context, the utilization of a plurality of transport protocols in the network RE, which links a plurality of machines.

The various essential elements which constitute the command integration module CWE, which can also be called a command generation and execution module (or tool), are thus:

the descriptor file FD which contains the description of the graphical interface to be produced in a grammar specific to the tool, associated with a descriptor file editor GFD. The editor GFD, which is a set of functionalities that makes it possible to generate descriptor files from or without another descriptor file, is associated with the descriptor file FD.

grammar verification means, which ensure the lexical consistency of the descriptor file, also called a lexical analyzer AL.

graphical representation generating means MRG, connected to a lexical analyzer AL on the one hand, and to syntax checking means AS on the other hand, lexical analyzer AL: analyzes the lines in the descriptor file FD and, based on the grammar, generates a set of X/Motif (registered trademark) objects or a set of errors if there is any inconsistency in the contents of the descriptor file, means for checking the syntax of the information entered by the user in the graphical representation, also called a syntax analyzer AS, the protocol converter CP associated with encapsulation means ENC for the attributes of each command to be executed in the target platform(s), which make it possible to send the commands by means of a plurality of communications protocols, with each protocol allowing communication with a determined target platform, means for receiving the attributes of each command and executing it in accordance with these attributes, designated EXEC.

As may be seen in FIG. 6, the graphical representation generating means comprise:

graphical interface management objects OG. This interface is preferably the X/Motif (registered trademark) type.

a command window FC associated with the management objects OG, which makes it possible to obtain a representation of the command with all of its parameters. This is done by means of the X/Motif type graphical display system.

The editor GFD, the descriptor file FD, the generation means MRG, the syntax analyzer AS, and the encapsulation means ENC, which are associated with the communication means MCOM (actually means for sending commands, where SERV is concerned), are contained in the control server SERV associated with the user.

The latter also contains:

the contextual interface IC, error handling means TER, means to test for the existence of a command, namely TEC.

The contextual interface IC makes it possible, as a function of the application environment, to transmit a data set to the command window FC, which facilitates the entry of data by the end user.

The means to test for the existence of a command TEC make it possible, before the execution of a command, to verify that the command is in fact available in the target machine (PLC1 through PLC4, see above) by polling the latter during the command entry operation.

The error handling means TER, for all cases of errors, make it possible to dialogue with the end user who enters the parameters in the command window and requests the execution of the associated command by indicating the error type to the user. Likewise, they process the errors which result from the execution of the commands.

The protocol converter CP makes it possible to send the parameters of the command using communication means MCOM chosen by the user. As indicated above, the converter CP is closely associated with the protocol encapsulation means ENC which accompany the attributes of each command with the specific elements of each protocol. In the example of embodiment shown in FIG. 6, the number of protocols chosen is six, namely PR1 through PR6.

The reception and execution means EXEC are associated with a command repertoire RP.

Specific means for receiving and executing each command, namely EXEC1 through EXEC4, correspond to each of the platforms PLC1 through PLC4. In addition, each platform has a command repertoire, namely RP1 through RP4. This repertoire contains a set of commands in which the actions to be taken are described as a function of the parameters entered by the end user.

It is obvious that the set of means EXEC1 through EXEC4 forms the reception and execution means EXEC defined above. Likewise, the set of command repertoires RP1 through RP4 forms the global command repertoire RP defined above.

B) The operational continuity module MCF comprises:

a module MBL for periodically scanning the log files (LOG), a module MGE for defining and executing actions in the platform following an event produced by the scanning module, a module MSV for monitoring the components of the applications, which uses the module MGE to prevent any possible abnormal operation of the application, a high availability module MCO which ensures continuity of service to the end user of the platform.

1) The module MBL performs a periodic reading of the contents of the log file LOG of APA and transmits this data to the module MGE, with which it is closely associated.

2) The module MGE, upon reception of the data transmitted by MBL, analyzes them, and when it detects abnormal events occurring during the running of APA, it acts on APA in order to correct the abnormal condition which produced these events. When a correction action proves to be necessary, as soon as this action is carried out, it triggers an alarm which warns the user that the application APA has undergone a modification of its characteristics. In a preferred embodiment of the invention, MGE is constituted by a software module of the RSF type marketed by the Applicant.

3) The module MSV must be able to monitor and to act on all the attributes in the set of the different resources RES of the application. Its purpose is to initiate actions based on its knowledge of these attributes, when they fulfill one or more conditions for action. Inasmuch as possible, for performance reasons, the action will be local (at the level of a determined machine PLCi) and will not be performed by the central administration manager of PL, even if it is notified of the action. The configuration of the various application monitors is done from this manager.

4) The module MCO, which ensures the operational continuity of APA, supplies both a development tool and a runtime environment which makes it possible either to create reliable distributed applications or, when applied to existing distributed applications, to give them very high availability by duplicating them. Modules of this type exist on the market. One of these, for example, is marketed by Isis Distributed Systems under the name Isis (registered trademark). Another is marketed by the Applicant and by IBM under the name HA-CMP.

C) The accounting and security module MSC comprises:

a security module SEC which intercepts the dialogues between the processes in order to ensure their logical security, accounting means COMP for the resources consumed by the user.

1) The security module SEC uses the technology known to one skilled in the art by the English term "firewall" technology. In the example of embodiment described here, this module is the Gauntlet type marketed by T.I.S. (Trusted Information Systems). The description here will be limited to a summary of the principal functions and characteristics of a module of this type, as well as its general architecture, in relation to FIGS. 7a and 7b.

First of all, the following is a summary of several essential definitions:

- A "firewall" is composed of a filter for the protocol IP, associated with a filter at the level of each application and with a security server located at the level of PL.
- An IP Firewall is used to filter all communications at the level of the protocol used above the network interfaces, which interfaces are for example the Ethernet type (defined by ISO standard 8802.3), the X-25 type (defined by CCITT recommendation), the FDDI type (ANSI standard X3T9-5), etc., in fact at the lowest layers of the network.
- Firewall applications form a set of components of the application, or of an extension of the application, which filter the principal services supplied by the upper layers in the TCP protocol (Transmission Control Protocol, defined by the RFC793 standard of the UNIX— registered trademark—standard) with its different variants such as FTP, Telnet, etc. (defined by RFC standards 959 and 854, respectively, of the UNIX— registered trademark—standard).
- a security server is a machine (belonging to any one of the platforms PLi) whose function is to provide an authentication service by delivering tickets which may be used to protect the dialogues in the network REE. The firewall uses a server of this type to avoid having to send passwords through REE.

The principal functions of a "firewall" are, at certain times, to allow or refuse access to any server running on any machine of PL for the benefit of a specific client, to transparently connect a client to a specific server running on a given machine of PL through its intermediary (the server is then hidden by the connection to the "firewall"), to authenticate users with different protocols (with simple passwords, passwords which expire at a given time, etc.), to accept or refuse the requests from clients for servers of the FTP and web (name of the worldwide IP network in the shape of a spider web) types, and to support the filtering of the traffic in various network interfaces (lower layers X25, FDDI, Ethernet, etc.).

In addition, a "firewall" must be able to ensure the logging of information related to the traffic in the IP network and the utilization of the servers belonging to the machine PL, or even to ensure the administration of filters for applications such as APA, or IP filters, through the graphical interface GI of the module MBO.

Figure 7A:
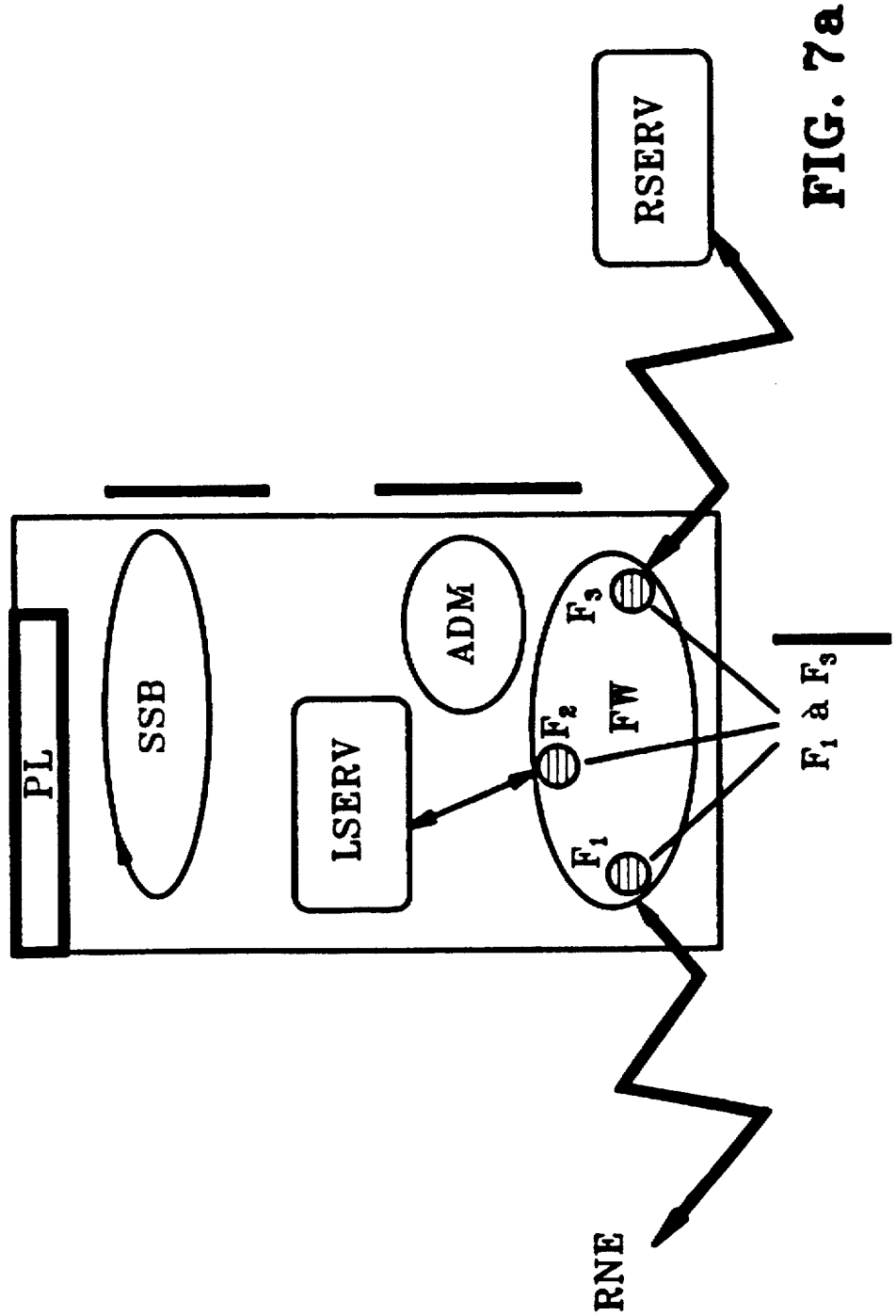

FIG. 7a shows the platform PL which contains a firewall FW equipped with its filters F1, F2, F3, each of which is responsible for filtering an application of a particular type, for example Telnet, FTP, etc. In a "client/server" type dialogue in which the server belongs either to a set of local servers LSERV (in the same platform PL) or to a set of remote servers RSERV (belonging to platforms PLi other than PL), the "firewall" FW intercepts and protects any dialogue between the client and LSERV or RSERV.

Figure 7B:
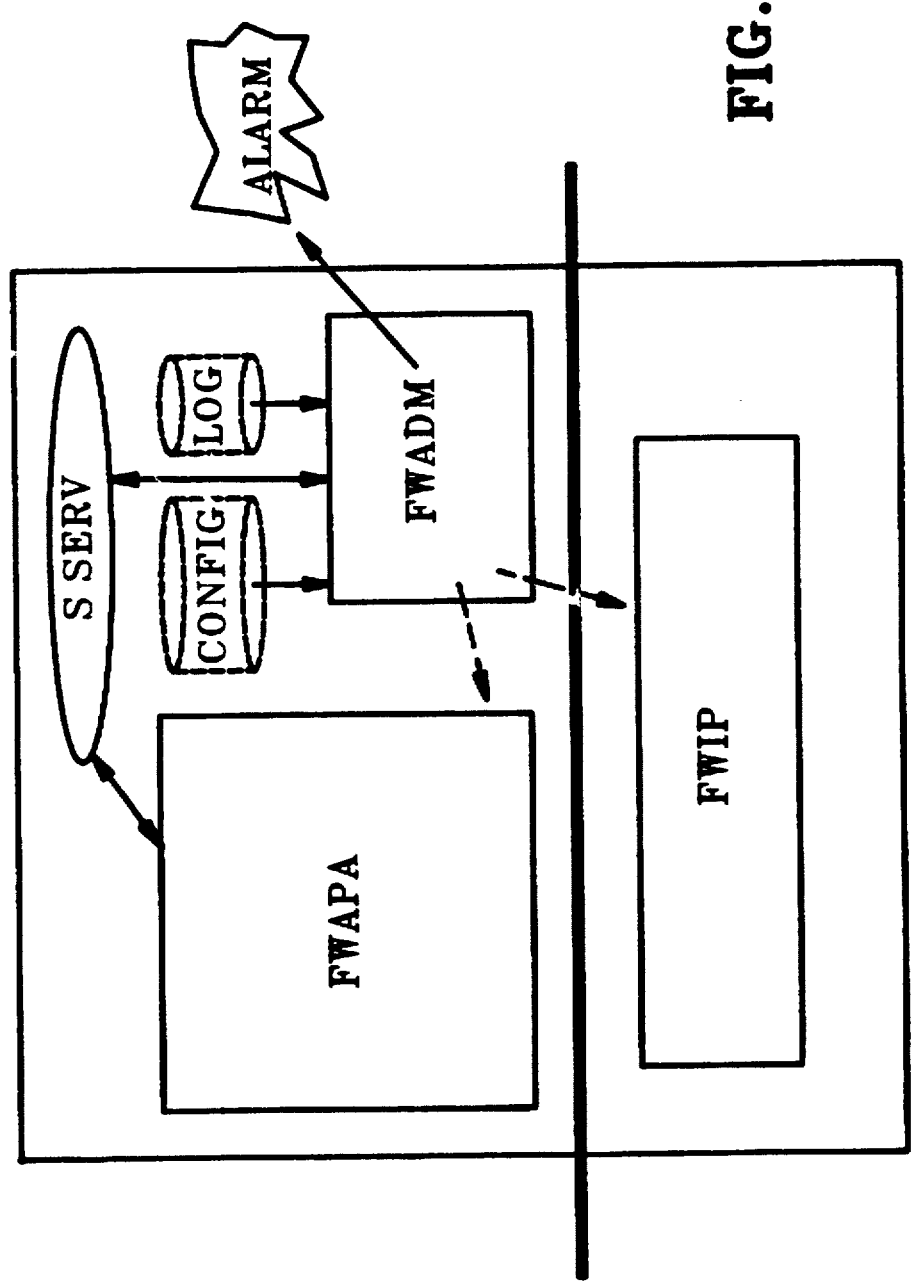

FIG. 7b shows a more detailed structure of the global "firewall" FW. In this case it can be broken down into a "firewall" FWIP at the level of the Internet network IP, into a set of "firewalls" FWAPA at the level of the applications, and a security server SSERV linked to the firewall FWAPA. The administration module FWADM for the firewall FW is linked to FWAPA, to SSERV, to FWIP and to the various configuration files FIG of PL, as well as to the log files LOG and to the alarm system ALARM of the platform PL.

The accounting means COMP enable the accounting of all consumption of resources used by the user of PL: the central processor, memories, disks, etc. A server in a client/server application runs without necessarily knowing which user is requesting its service.

By inserting a dialogue interception module of the firewall type or even of the type described in French patent application No. 93 14288 filed on Nov. 30, 1993 by the Assignee of Applicant, under the title "Automatic conversion process for porting telecommunication applications from the TCP/IP network to the OSI-CO network and module used in said process and its U.S. counterpart Ser. No. 08/348,860 filed on Nov. 28, 1994", it is possible to identify the user of the services requested, thereby performing an accounting of the resources consumed for the benefit of this user. The subject matter of application Ser. No. 08/348,860 is hereby incorporated by reference.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

We claim:

1. An architecture (MO) for the integration of applications (APA) into a business data processing platform (PL) constituted by an internal network (RE) of machines (PLC1 through PLC4) running a plurality of heterogeneous applications (APA), the codes of which are not modifiable and each of which contains at least some or all of the following external interfaces (IE):

a configuration file (FIG), a log file (LOG) which records the events related to it, a mechanism (COM) for communicating between processes running on this machine or these machines, a set of commands (CD) which make it possible to modify its characteristics, a set of system resources (RES) which allow it to run, a set of peripherals (PER) used for its data input/output needs, characterized in that, for the purpose of modifying the basic characteristics of these applications, in a way that is transparent to the user, relative to their security, availability, ergonomics, administratability, interoperability, monitoring, accounting of the resources consumed by the user, it comprises:

a) an ergonomic integration module (MIG) for centralized control of the applications (APA) with a graphical interface (GI), b) an operational continuity module (MCF) which, by periodically scanning the log files and by monitoring the components of the applications (APA), executes actions to prevent them from operating abnormally, c) a module (MSC) for intercepting the dialogues between these components in order to ensure the logical security of the applications (APA) and the accounting of the resources consumed by the user.

2. The integration architecture according to claim 1, characterized in that the ergonomic integration module (MIG) comprises:

- a control panel module (MBO) which controls all of the applications,
- a command integration module (CWE) with a graphical interface.

3. The integration architecture according to claim 1, characterized in that the continuity module (MCF) comprises:

- a module (MBO) for periodically scanning the log files (LOG),
- a module (MGE) for defining and executing actions on the platform following an event produced by the scanning module,
- a module (MSV) for monitoring the components of the applications, which uses the definition module to prevent any abnormal operation of the application,
- a high availability module (MCO) which ensures the continuity of service to the end user of the platform.

4. The integration architecture according to claim 1, characterized in that the interception module (MSC) comprises:

- a security module (SEC) which intercepts the dialogues between the processes in order to ensure their logical security,
- accounting means (COMP) for the resources consumed by the user.

5. The integration architecture according to claim 2, characterized in that the control panel module (MBO) comprises a set of modules and icons which correspond to the various applications which can run on the business platform (PL), for which two possibilities are offered to the user:

- a first mode in which it navigates in a cascading window mode,
- a second mode with a single window in which the applications are represented in a single tree which allows direct access to an application by clicking once on the mouse associated with the graphical interface, wherein the user can switch from the conventional mode to the single-window mode at any time and vice versa.

6. The integration architecture according to claim 5, characterized in that, in the first mode, the control panel module (MBO) manages and administrates all the applications (APA) which are called to run on said platform (PL), by giving a complete, hierarchical view of their organization by class of utilization, wherein the description of this organization, which is separate from the graphical interface (GI) itself, is made in a file (CONFIGS) for describing the cascading structure of the various windows, a file which is located in the machine on which the graphical interface runs (GI).

7. The integration architecture according to claim 2, characterized in that the network (RE) which supports a plurality of communications protocols (PR1 through PR6) and the platform (PL) which includes a control platform (SERV) and target platforms (PLC1 through PLC4), the command integration module (CWE) with a graphical interface (GI) comprises:

- a descriptor file (FD) which contains the description of the graphical interface (GI) to be produced in a grammar specific to the integration module (CWE),
- grammar verification means (AL), which ensure the lexical consistency of the descriptor file (FD),
- graphical representation generating means (MRG) connected to the verification means on the one hand, and to the tools of the graphical interface on the other hand,
- syntax checking means (AS) for the information entered by the user into the graphical representation,
- encapsulation means (ENC) for the attributes of each command to be executed on the target platform(s) (PLC1 through PLC4), for a plurality of communications protocols (PR1 through PR6),
- means for receiving the attributes of each command and for executing it (EXEC1 through EXEC4) based on these attributes.

8. The integration architecture according to claim 4, characterized in that since the business platform (PL) is linked to other business platforms outside itself by means of an external network (REE) and since it has an alarm system (ALARM), the security module (SEC) is formed by a "global firewall" (FW) which has an administration module (FWADM) and which breaks down into a "network firewall" (FWIP) at the level of the external network (REE), into a set of "application firewalls" (FWAPA) at the level of the applications (APA), and into a security server (SSERV) belonging to the business platform (PL) linked to the "applications firewall" (FWAPA), which administration module (FWADM) is linked to the set of "applications firewalls" (FWAPA), to the security server (SSERV), to the "network firewall" (FWIP), and to the configuration files (FIG) of the platform (PL), as well as to the log files (LOG) and to the alarm system (ALARM).

* * * * *